United States Patent
Riedl et al.

(10) Patent No.: US 8,975,800 B2
(45) Date of Patent: Mar. 10, 2015

(54) ROTOR FOR AN ELECTRIC MOTOR, AN ELECTRIC MOTOR AND A PRODUCTION PROCESS FOR AN ELECTRIC MOTOR

(75) Inventors: Reinhard Riedl, Finning (DE); Jochen Erhardt, Klosterlechfeld (DE)

(73) Assignee: Hilti Aktiengesellschaft, Schaan (LI)

( * ) Notice: Subject to any disclaimer, the term of this patent is extended or adjusted under 35 U.S.C. 154(b) by 856 days.

(21) Appl. No.: 13/135,766

(22) Filed: Jul. 14, 2011

(65) Prior Publication Data

US 2012/0014823 A1     Jan. 19, 2012

(30) Foreign Application Priority Data

Jul. 15, 2010    (DE) .......................... 10 2010 031 399

(51) Int. Cl.
| | |
|---|---|
| H02K 1/27 | (2006.01) |
| H02K 15/03 | (2006.01) |
| H02K 1/30 | (2006.01) |
| H02K 15/02 | (2006.01) |
| H02K 15/12 | (2006.01) |

(52) U.S. Cl.
CPC .................. H02K 15/03 (2013.01); H02K 1/30 (2013.01); H02K 15/02 (2013.01); H02K 1/276 (2013.01); H02K 15/12 (2013.01)
USPC ....... 310/216.004; 310/216.011; 310/216.121

(58) Field of Classification Search
None
See application file for complete search history.

(56) References Cited

U.S. PATENT DOCUMENTS

| | | | | |
|---|---|---|---|---|
| 3,601,640 | A | * | 8/1971 | Egawa ........................ 310/49.34 |
| 4,204,314 | A | | 5/1980 | Workman |
| 4,360,751 | A | * | 11/1982 | Arnold et al. ............... 310/60 R |

(Continued)

FOREIGN PATENT DOCUMENTS

| | | |
|---|---|---|
| DE | 717 829 A | 2/1942 |
| DE | 1 286 196 | 1/1969 |

(Continued)

OTHER PUBLICATIONS

Kikuchi et al: "A Unique Desktop Electrical Machinery Laboratory . . . " Chapter v, Sample Experiments, IEEE Transactions on Eductaion, Nov. 1997, vol. 40, No. 4.

*Primary Examiner* — Tran Nguyen
(74) *Attorney, Agent, or Firm* — Davidson, Davidson & Kappel, LLC

(57) ABSTRACT

A rotor (100) for an electric motor (1000). The rotor (100) has a rotor shaft (10) and a rotor core (20) attached onto the rotor shaft (10). The rotor core has a plurality of core laminations (40, 140) arranged along an axis (A) of the rotor core (20), and has a plurality of poles of at least one pole pair, the core lamination (40, 140) having:
a central recess (70, 170) through which the rotor shaft (10) passes and which has a contour (71, 171) as well as adjacent areas (AF), and a plurality of receiving structures arranged at peripheral angular positions in order to each form a receiving element for a pole-forming element on the rotor core (20). In this context, it is provided according to the invention that the rotor core has a surface (OF) facing the rotor shaft (10) that is formed together with the adjacent areas (AF) of the central recess (70, 170) of the plurality of core laminations (40, 140), and that has uneven areas crosswise to the axis (A) of the rotor core (20) that are formed by the contours (71, 171) of the central recesses (70) of the plurality of core laminations (40, 140). The contours (71, 171) of the central recesses (70, 170) of at least a first core lamination and a second core lamination of the plurality of core laminations (40, 140) are arranged so as not to be congruent with each other.

18 Claims, 9 Drawing Sheets

(56) References Cited

U.S. PATENT DOCUMENTS

| | | | |
|---|---|---|---|
| 5,649,349 A * | 7/1997 | Greenway | 29/598 |
| 5,986,366 A * | 11/1999 | Bailey et al. | 310/52 |
| 6,177,749 B1 * | 1/2001 | Hussey et al. | 310/216.121 |
| 6,198,185 B1 * | 3/2001 | Bruhn et al. | 310/68 B |
| 7,808,147 B2 | 10/2010 | Riedl et al. | |
| 2005/0269888 A1 * | 12/2005 | Utaka | 310/156.53 |
| 2007/0132335 A1 * | 6/2007 | Ionel et al. | 310/261 |
| 2008/0252165 A1 * | 10/2008 | Riedl et al. | 310/156.08 |
| 2010/0047072 A1 | 2/2010 | Holzschuh | |

FOREIGN PATENT DOCUMENTS

| | | |
|---|---|---|
| DE | 94 10 386 U1 | 11/1995 |
| DE | 10 2007 000 213 | 10/2008 |
| GB | 2290914 | 1/1996 |
| WO | WO 00/28642 A1 | 5/2000 |
| WO | WO 2008/064868 | 6/2008 |

\* cited by examiner

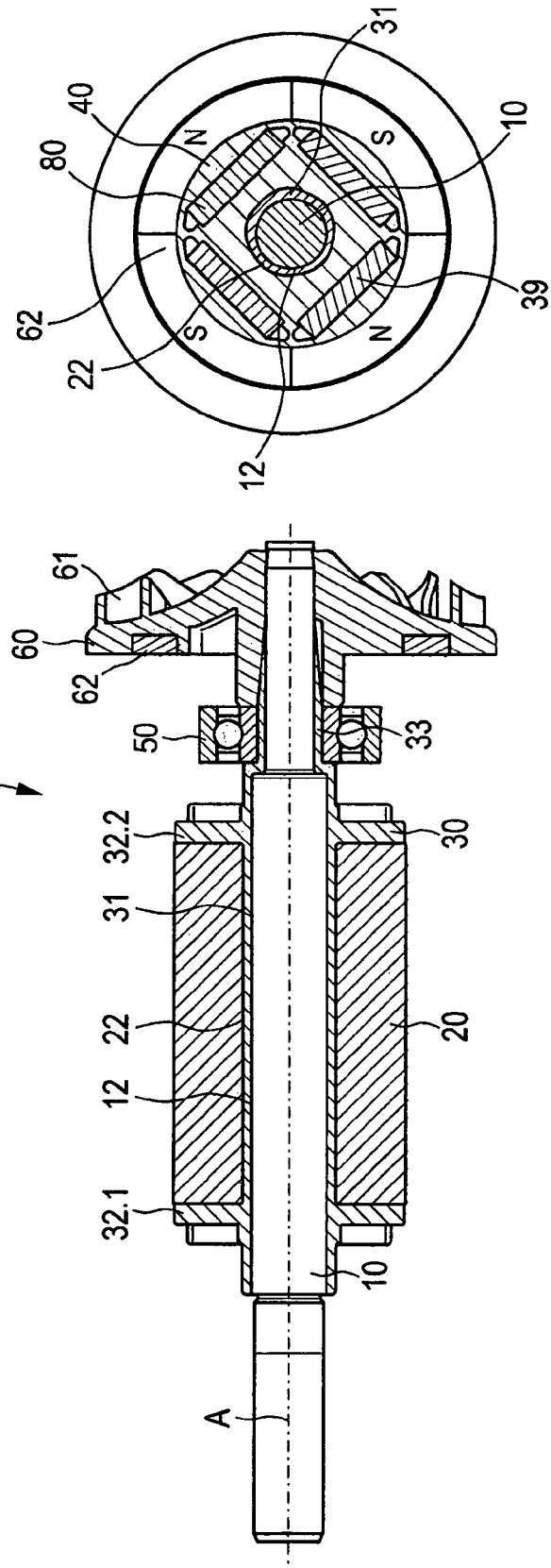

ROTOR FOR AN ELECTRIC MOTOR, AN ELECTRIC MOTOR AND A PRODUCTION PROCESS FOR AN ELECTRIC MOTOR

This claims the benefit of German Patent Application DE 10 2010 031 399.8, filed Jul. 15, 2011 and hereby incorporated by reference herein.

The invention relates to a rotor for an electric motor, especially for a permanently excited electric motor. The invention also relates to a production process for a rotor or for an electric motor.

BACKGROUND

A rotor of the above-mentioned type for a permanently excited electric motor is known, for example, from Japanese patent JP 2005 012859. It is a known procedure to use various adhesion, welding or laminating techniques to affix a rotor core to a rotor shaft, or to arrange core laminations of the rotor core on each other. In Japanese patent 2002 354722, a rotor core is connected to the rotor shaft by means of a plastic transfer-molding process. It is also a known procedure to compression-mold a rotor core onto a smooth or knurled rotor shaft.

In a permanently excited electric motor such as, for example, a BLDC or BLAC electric motor, a permanent magnet can be inserted into a chamber of the rotor core formed with a receiving opening and affixed there. Receiving openings—as shown in WO 2006/090567 A1—can form an obliquely oriented chamber or can be oriented at different angles of inclination relative to a central recess of the rotor core through which the shaft passes.

SUMMARY OF THE INVENTION

A problematic aspect of the above-mentioned types of connection is fundamentally the relatively laborious assembly. Thus, when individual core laminations are attached in order to form the rotor core on a rotor shaft, the tolerances cannot be ascertained sufficiently precisely, which usually calls for a subsequent work step, namely, the labor-intensive balancing of the rotor. During the balancing procedure, in particular, the placement of balancing weights onto the rotor can entail drawbacks for the later operation. The rotor position is usually detected by using a Hall sensor on the stator of the electric motor to detect the position of the rotor relative to the stator. During operation, this is used to control a magnetic coupling between the rotor and the stator, that is to say, to control the electric motor.

Moreover, it is regularly necessary to carry out a laborious adjustment of the permanent magnets relative to each other so that a rotor position can be detected very precisely during the operation of the electric motor. Merely gluing or clamping a permanent magnet in a peripheral receiving opening of the rotor core or of a core lamination has proven to be inadequate in this context. Here, the conditions for a secure fixation of a permanent magnet differ from the conditions for a precise positioning of a permanent magnet. The former regularly require more space, while the smallest possible space tolerance is preferred for the latter. It would be desirable to have a rotor core that makes it possible to achieve a simultaneously secure and yet precise attachment onto the rotor shaft and/or the formation of a receiving element for a pole-forming element on the rotor core. It would also be desirable to have the most simplified production process possible for an improved rotor or electric motor. If possible, there should be no need to readjust or balance a rotor after the rotor shaft and the rotor core have been assembled with permanent magnets.

It is an object of the present invention to provide a rotor, an electric motor and a production process for a rotor or for an electric motor in which the production of a rotor or electric motor is simplified and yet, the manufacturing tolerance and/or manufacturing quality of the rotor or electric motor are ensured to a sufficient extent.

In particular, the adjustment or balancing steps that have been needed in a production process until now should be avoided or reduced, and yet, the production of a rotor or electric motor with a sufficient or improved manufacturing precision should be made possible.

In particular, an arrangement of a permanent magnet relative to a core lamination should be ensured in a sufficient or improved manner, and yet, it should be simplified in terms of its production. In particular, a rotor core should be affixed onto the rotor shaft as securely as possible—axially as well as radially—and with a sufficient manufacturing tolerance. In particular, the magnetic field conditions should be improved; in this context, it should preferably be possible to adhere to minimum values for air distances and creepage distances. In particular, the positioning of a fan and/or of a bearing relative to the rotor core should be simplified as well as secure, and yet, it should be ensured that the tolerance is sufficient.

The present invention provides that the rotor core has an uneven surface oriented towards the rotor shaft, and this surface is formed, among other things, with adjacent areas and with contours of the central recess of the plurality of core laminations. This can especially comprise edges, inner surface areas and side areas or similar parts of adjacent areas around the central recess. The surface is essentially an inner circumferential side of the rotor core that faces an outer circumferential side of the rotor shaft.

In the area of the central recess, the especially rotated arrangement of at least some of the plurality of core laminations results in this uneven surface. It is especially formed by uneven areas in the axial direction of the rotor core in which at least some of the plurality of core laminations are not arranged congruently to each other with respect to the central recess. The concept of the invention provides that a first core lamination has to be made to coincide congruently relative to a second core lamination in terms of the receiving structure in order to form a receiving element for a pole-forming element on the rotor core, while, with such an especially rotated arrangement of a first core lamination and a second core lamination, the contour of the central recess does not come to lie congruently with each other. This leads to a preferred above-mentioned uneven surface in the axial direction of the rotor core.

According to a refinement, it is provided, for example, that, at least in part, core laminations are rotated with respect to each other according to a multiple rotational symmetry of the receiving structures—at least a first core lamination is rotated relative to a second core lamination, for example, in case of a four-fold rotational symmetry, by 90°, with respect to each other. According to the concept of this refinement, it is provided that a contour of the central recess does not follow the multiple rotational symmetry of the receiving structures.

The concept can be carried out especially on the basis of the refinements explained below by way of examples.

In particular, a contour of the central recess can diverge irregularly from a circular shape. It has proven to be especially advantageous for a contour to differ from an even-numbered rotational symmetry and to have an odd-numbered rotational symmetry. In particular, the central recess of a core lamination can have a contour in the form of a polygon or a convex arc-polygonal orbiform curve. A Reuleaux triangle or a pentagon or a seven-cornered convex arc-polygon or a different orbiform curve have proven to be especially advantageous. The term orbiform curve especially refers to a contour having a constant width—but not a circle—in which all of the possible diameters have the same value. In particular, the number of sides is an odd number and all of the sides have the same length. A particularly suitable contour of the central recess is one that runs with a roundness deviation between an inscribed circle having an inner diameter and a circumscribed circle having an outer diameter. The roundness deviation is preferably greater than 0.1%, especially greater than 0.5%, especially smaller than 5%, especially smaller than 2%, of a mean value resulting from the inner diameter ($D_i$) and the outer diameter ($D_a$). This has proven to be especially advantageous for attaching the rotor core onto an optionally untreated surface of a rotor shaft.

For example, for a contour of the central recess, the polygonicity of a convex arc-polygon is selected in such a way that it does not coincide with the multiple rotational symmetry of the arrangement of the receiving structures for a pole-forming element. It has proven to be especially advantageous to select the combination explained in the drawing consisting of a four-fold rotational symmetry for receiving openings, permanent magnets or armature teeth for coil windings, and to select a pentagon or Reuleaux triangle for the contour of the central recess. With a four-pole rotor, the choice of a pentagonal convex arc-polygon is preferred for realizing the concept of the refinement. In a modification within the scope of the concept of the refinement involving a two-pole rotor, a Reuleaux triangle, that is to say, a triangular convex arc-polygon, can be selected for the contour of the central recess. Fundamentally, it has proven to be preferable for the multiple rotational symmetry for the receiving structures to be selected with an even number, and for the angularity of a convex arc-polygon for a central recess to be selected with an odd number. Preferably, the value of the even-numbered rotational symmetry for the receiving structure is "1" higher than the value of the odd-numbered rotational symmetry of the contour of the central recess. Such a combination for the configuration of the rotational symmetry of the receiving structures, on the one hand, and the contour of the central recess, on the other hand, has proven to be especially advantageous for a radially and axially secure attachment of a rotor core onto a rotor shaft. In particular, manufacturing tolerances can be adhered to properly, taking minimum values for air distances and creepage distances into account, so that magnetic stray fields and other losses are largely avoided. It has also turned out that a surface in the axial direction of the rotor core is so uneven on an inner circumferential side that a complex gap is formed in comparison to an essentially smooth and cylindrical outer circumferential side of the rotor shaft. Depending on the requirements, the gap can be used for inserting transfer-molding compound during the fixation of the rotor core onto the rotor shaft, or for inserting excess flow material during the interference fit of a rotor core onto a rotor shaft. Advantageously, during the production, a rotor core can also be securely affixed without a special surface treatment of the rotor shaft—for example, knurling the outer circumferential side of the rotor shaft.

The concept of the invention also yields an electric motor, especially a permanently excited electric motor, for example, a BLDC or BLAC electric motor. It has a magnetically coupled arrangement of a stator and a rotor, said rotor being configured according to the concept of the invention explained above, and said stator having a plurality of stator poles associated with one pole pair of the rotor.

This electric motor has greater power as a result of its more reliable and precise assembly, especially since the production process allows better magnetic field conditions, and the minimum values for the air distances and creepage distances are adhered to because of the precise manufacturing tolerances.

The concept of the invention also yields a hand-held power tool with an electric motor according to the concept of the invention.

In order to achieve the object in terms of the production process, the concept of the invention puts forward a production process of the type described above, with which a rotor and/or an electric motor can be produced relatively simply in an especially advantageous manner, and yet, the rotor core can be attached onto the rotor shaft especially securely and with high precision.

The production process for an electric motor provides for the magnetically coupled arrangement of the rotor produced according to the invention and having the stator, said stator having a plurality of stator poles associated with one pole pair of the rotor.

According to the invention, the production process for a rotor comprises the following steps:
  providing the rotor shaft;
  attaching a rotor core onto the rotor shaft having a plurality of core laminations arranged along an axis of the rotor core, and having a plurality of permanent magnets arranged at peripheral angular positions, while forming poles of at least one pole pair,
  wherein a core lamination has:
    a central recess through which the rotor shaft passes and which has a contour as well as adjacent areas, and
    a plurality of receiving openings arranged at peripheral angular positions in order to each form a chamber for a permanent magnet in the rotor core.
The attachment is carried out by:
  arranging a first core lamination so as to be rotated relative to a second core lamination
    while forming the chamber in the rotor core through which the permanent magnet can pass, and
    while forming a surface of the rotor core facing the rotor shaft together with the adjacent areas of the central recesses of the plurality of core laminations, and with uneven areas crosswise to the axis of the rotor core that are formed by the contours of the central recesses of the plurality of core laminations,
    in that the contours of the central recesses of at least a first core lamination and a second core lamination of the plurality of core laminations are arranged so as not to be congruent with each other.
After the permanent magnets have been inserted into the appropriate chambers, the following is provided:
  transfer molding of a transfer-molding compound axially and/or radially around the laminated core.

The concept of the production process according to the invention ensures—aside from the advantageous attachment of the rotor core onto the rotor shaft as explained above—the formation of a continuous chamber to receive a permanent magnet, in spite of the rotating of the core laminations with respect to each other. At least two, preferably four or a higher, even number of permanent magnets is provided in order to form at least one pole pair on the rotor core. Especially advantageously, a particularly good fixation of the rotor core onto the rotor shaft is ensured by assembling and affixing the core laminations relative to each other and to the rotor shaft, and then additionally by transfer molding a transfer-molding compound axially and/or radially around the laminated core.

This can be achieved especially preferably by means of a suitable transfer-molding process.

Particularly preferably, by means of additional advantageous measures, a permanent magnet can be positioned especially securely and precisely in a chamber formed by the receiving openings of the laminated cores. The conditions regarding dimensional stability and secure fixation of a permanent magnet, which seem to be contradictory to each other, can be very advantageously reconciled with each other in a chamber.

Additional advantageous refinements of the inventions can be gleaned from the subordinate claims, and they provide details of advantageous possibilities for realizing the above-mentioned concept within the scope of the object as well as in terms of additional advantages.

Advantageously, the rotor core is attached onto the rotor shaft by means of transfer molding and/or interference fit. When it comes to achieving a transfer molding and/or an interference fit, it has proven to be especially preferable for the value of an outer diameter of the rotor shaft to fall between an inner diameter of an inner cylinder defined by an inscribed circle and an outer diameter of an outer cylinder defined by a circumscribed circle, said cylinders being associated with the surface of the rotor core facing the rotor shaft. Especially advantageously, a gap formed between the rotor shaft and the contour of the recess can be thus filled with transfer-molding compound. In addition or as an alternative, a pressing surface of the recess adjacent to the contour can be pressed against the rotor shaft, especially deformed continuously.

Preferably, the gap has the dimension of a roundness deviation as mentioned above. As explained, it is preferably defined such that the contour of the central recess runs with a roundness deviation between an inscribed circle thereof having an inner diameter and a circumscribed circle thereof having an outer diameter. The roundness deviation is preferably greater than 0.1%, especially greater than 0.5%, especially smaller than 5%, especially smaller than 2%, of a mean value resulting from the inner diameter and of the outer diameter.

Within the scope of an especially preferred refinement, it is provided that a core lamination additionally has a plurality of encoding markings on the basis of which the first core lamination can be secured relative to the second core lamination so as to be rotated. Preferably, the first and second core laminations are rotated relative to each other while each forming a chamber in the rotor core through which the permanent magnet passes.

The term encoding marking arrangement fundamentally refers to any suitable defining marking on a core lamination—especially as a structural configuration of the core lamination—which is provided in addition to the features of the generic part of claim 1, and which is also configured so as to ensure that the relative arrangement of the core laminations with respect to each other is sufficiently precise when they are rotated. Preference is given to an encoding marking that is simultaneously suitable as a stop means of a core lamination—be it on another core lamination or on a production means. For example, if the core lamination with the encoding marking reaches a stop on a production means such as a transfer mold or the like, the first core lamination can be secured relative to the second core lamination so as to be rotated, and/or the rotor core can be secured on the production means. Advantageously, the first core lamination and the second core lamination are secured by means of the encoding marking, especially with a peripheral encoding recess, especially as an edge recess, on the production means such as, for example, a transfer mold. Thus, the rotor core can be inserted into a transfer mold, i.e. the individual insertion of a core lamination, so as to be encoded according to the encoding marking arrangement. The encoding marking arrangement can also be used to secure a first core lamination onto a second core lamination. The encoding marking arrangement makes it possible to reliably assemble the core laminations during the production process so that they are sufficiently secured relative to each other, and to affix them in this position with the requisite manufacturing tolerance.

Due to an assembly position of the core laminations that has been thus encoded, the rotor core can be created and the subsequent production steps of the rotor can be carried out in a simplified manner. In particular, the need for additional adjustments can be reduced since the assembly with the encoding marking is already performed with sufficient precision. In particular, a plurality of additional encoding markings that are harmonized with each other can be prescribed for other parts of the rotor in order to simplify the relative positioning of the rotor core, especially relative to the fan and/or the stator. A rotation of the first and second core laminations relative to each other also forms the basis to improve the attachment of the rotor core onto the rotor shaft, and yet to simplify the production of the rotor.

During the production process, it is especially preferred for a core lamination to have an encoding marking arrangement according to a multiple rotational symmetry of the permanent magnet arrangement or according to a multiple rotational symmetry that conforms thereto, that is to say, in such a manner that the first and second core laminations are rotated relative to each other while each forming a chamber in the rotor core through which a permanent magnet passes. Thus, a core lamination that has a plurality of encoding markings can be inserted into a transfer mold in order to form the rotor core in a manner that is encoded on the basis of the plurality of encoding markings, and the first core lamination can be arranged rotated relative to the second core lamination and with a plurality of receiving openings that are arranged congruently to each other, so that the receiving openings that are arranged congruently to each other form the chamber in the rotor core through which the permanent magnet passes.

It has proven to be especially preferable for the plurality of receiving openings to be arranged at first peripheral angular positions according to an even-numbered rotational symmetry. Preferably, the plurality of encoding markings at second peripheral angular positions are arranged according to the even-numbered rotational symmetry or according to a lower even-numbered rotational symmetry. The central recess through which the rotor shaft passes preferably has a contour that has an odd-numbered rotational symmetry. An especially preferred surface of the rotor core facing the rotor shaft is formed if, according to this refinement of the invention, the first and second core laminations are rotated relative to each other according to the even-numbered rotational symmetry.

The non-rotatable arrangement of the core laminations by means of the encoding markings ensures that a first core lamination can be arranged relative to the second core lamination with a sufficient manufacturing tolerance during the production process, without there being a need for a readjustment or a subsequent balancing procedure for a rotor core; in any case, however, such an effort is reduced. Nevertheless, the encoding marking arrangement advantageously allows any desired rotated arrangement of the first core lamination relative to the second core lamination, for example, within a predefined multiple rotational symmetry, so that this simplifies the production step.

The term multiple rotational symmetry refers to a rotational symmetry that, when a first core lamination is rotated relative to a second core lamination, nevertheless causes the receiving openings for permanent magnets or the encoding marking arrangement to coincide essentially congruently. In particular, this refers to an even-numbered rotational symmetry, that is to say, for instance, a two-fold, four-fold, six-fold, eight-fold, etc. rotational symmetry. One speaks of an n-fold rotational symmetry when a rotation by 360°/n projects the receiving openings or the encoding marking arrangement of the core lamination onto themselves. For example, in the case of a four-fold rotational symmetry, after a 90° rotation, the receiving openings of a first core lamination each have to be made to coincide congruently with the receiving openings for a permanent magnet of a second core lamination. The above-mentioned example of a four-fold rotational symmetry relates, for example, to the arrangement of four permanent magnets in four recesses of a rotor core in a 90° position with respect to each other. In that case, it is a four-pole version of a rotor with four permanent magnets held in a rotor core. One embodiment that explains this refinement by way of an example is described on the basis of the drawing. The concept of the invention, however, is not fundamentally limited to a specific number of poles, but rather can fundamentally refer to any desired multiple rotational symmetries—for example, also odd-numbered ones—although even-numbered rotational symmetries are especially preferred as will be explained below. A receiving opening for a permanent magnet can fundamentally be oriented as needed, for example, along a radius of the core lamination or along a secant of the core lamination. A recess for a permanent magnet or for some other receiving structure for a pole-forming element can also be arranged at an angle that differs from 90° or 180° relative to a radius of the core lamination, that is to say, obliquely to it. The latter does not affect the determination of the value of the rotational symmetry of the receiving openings or of the encoding marking arrangement.

Especially preferably, the at least one encoding marking arrangement is formed with a plurality of peripheral encoding recesses. A peripheral encoding recess in a core lamination is especially well-suited for securing the core lamination, for example, onto a transfer mold or for securing a first core lamination and a second core lamination relative to each other by means of the encoding recess.

It has proven to be especially preferred to have a plurality of peripheral encoding recesses that is formed with a plurality of edge recesses. The arrangement of the core lamination that takes manufacturing tolerances into account, especially in a transfer mold, is ensured in that a web of the transfer mold engages into the edge recess, thereby affixing the core lamination in the transfer mold. By stacking the plurality of core laminations on top of each other, a rotor core is created with a groove formed in the circumferential area of the rotor core by the edge recesses, said groove being held in a web of the transfer mold. Fundamentally, the arrangement of the groove and the web on the rotor core and on the transfer mold can be reversed. This is possible as long as the web does not have a detrimental effect on the rotor core or as long as it can be compensated for. According to this preferred embodiment, the core laminations can already be stacked by means of the encoding marking arrangement, within the framework of the manufacturing tolerance. A readjustment or a balancing procedure is not required; in any case, such separate correction steps are considerably reduced.

Moreover, it is preferable for a plurality of peripheral lamination points, especially holes or the like, to be formed at a distance from the edge. They can be filled with transfer-molding compound and can assist in securing a first core lamination relative to a second core lamination in a way that complies with the manufacturing tolerance, i.e. in the form of a non-rotatable arrangement of a first core lamination relative to a second core lamination within the framework of a prescribed manufacturing tolerance. Preferably, a lamination point is formed radially between a receiving opening through which a permanent magnet passes and the central recess through which the rotor shaft passes. This arrangement of the lamination points has proven to be especially suitable for creating a stable rotor core.

Especially preferably, a rotor core—as an edge core lamination—has an initial core lamination that, like the other multiple core laminations, also has a central recess through which the rotor shaft passes and which is arranged in the initial core lamination. Furthermore, at least one rectangular receiving opening is provided that is arranged peripherally in the initial core lamination and through which a permanent magnet passes. The essentially rectangular receiving opening surrounds an essentially rectangular permanent magnet with a practically precise fit. It is advantageously possible to leave some play all the way around the fit, so as to create a filling gap around a permanent magnet in order to use transfer-molding compound to securely affix said permanent magnet in the essentially rectangular receiving opening of the initial core lamination. In addition or as an alternative, a web that divides the receiving opening and/or a lateral bevel can be provided in order to axially affix the permanent magnet.

Preferably, a multiple core lamination of the plurality of core laminations is provided with a peripheral, essentially rectangular receiving opening through which a permanent magnet passes. Preferably, the essentially rectangular receiving opening has a lateral bulging section for receiving transfer-molding compound. In addition or as an alternative, the essentially rectangular receiving opening can also have a lateral cutaway section that is also suitable for receiving transfer-molding compound. A transfer-molding process can advantageously be used in this way in order to laterally affix a permanent magnet with sufficient transfer-molding compound for most of the rotor core.

Advantageously, the rotor core, as an edge core lamination, has a final core lamination that, like the other multiple core laminations, has a central recess through which the rotor shaft passes and which is arranged in the final core lamination. Furthermore, at least one essentially rectangular receiving opening is provided that is located peripherally in the final core lamination and that is associated with a permanent magnet—although advantageously, the permanent magnet does not pass through said rectangular receiving opening. The receiving opening preferably has a lateral bevel and/or a web that divides the opening. The lateral bevel and/or the web can hold a permanent magnet in the axial direction. All in all, the combination of an initial core lamination with a final core lamination and the at least partially rotated multiple core laminations in the rotor core ensures a lateral and axial fixation of a permanent magnet.

Within the scope of an especially preferred refinement, the rotor shaft has a bearing mount and/or a fan mount, especially a ball bearing mount. Preferably in the area of the bearing mount, the rotor shaft has a splined shaft. Preferably in the area of the fan mount, the rotor shaft has an encoding on the basis of which a fan wheel is to be arranged so as to be non-rotatable relative to the rotor shaft. In particular, the encoding conforms to the multiple rotational symmetry so that especially a fan wheel can be arranged so as to be non-rotatable relative to the receiving opening through which a permanent magnet passes. For example, the encoding of the bearing mount and/or fan mount can comprise a number of webs that is equal to the number of permanent magnets. For example, the encoding of the bearing mount and/or fan mount can have at least one flat side that is parallel to an orientation of a permanent magnet.

In particular, it has proven to be advantageous for a fan wheel installed on the rotor shaft to have a fan magnetic ring with poles and/or to have fan blades that are arranged according to the multiple rotational symmetry. The encoded bearing mount and/or fan mount reduces the work involved in a readjustment for the fan magnetic ring in order to position it precisely relative to the arrangement of the permanent magnets in the rotor core, since, in accordance with the encoding, all of the poles are preferably already arranged at the same angular positions. This refinement can be achieved especially easily in that the fan magnetic ring and/or the permanent magnets are only magnetized after the transfer molding process has been completed. In this manner, thanks to the encoding marking arrangement and/or the encoding for the fan mount, the premature magnetization of a permanent magnet or of the fan magnetic ring does not unnecessarily interfere with the precise arrangement relative to each other.

Preferably, the fan wheel also has fan blades that are arranged at peripheral angular positions of the permanent magnets or of other pole-forming elements on the basis of the encoding of the fan mount. Thus, it is possible to realize an electric motor—especially a permanently excited, BLDC or BLAC electric motor—which is especially advantageously cooled on the outside.

Preferably, when it comes to the electric motor, the rotor is placed into a magnetically coupled arrangement with respect to the stator, and the stator has a plurality of stator poles according to the multiple rotational symmetry. During operation, the stator poles are associated with alternating rotor poles, each in accordance with their rotation. Until now, the adjustment of the stator poles relative to the rotor poles has proven to be relatively laborious. This adjustment is normally carried out using a Hall sensor that is installed on the stator. According to an especially preferred embodiment, it is provided that a stator encoding secures at least one Hall sensor relative to the plurality of stator poles. In particular, a Hall sensor can be secured by the stator encoding exactly between two stator poles. Here, it is advantageously possible to dispense with a readjustment. Within the scope of an especially preferred variant, it has proven to be advantageous for a Hall sensor to be arranged on a printed circuit board that is secured relative to a carrier plate by means of plate encoding. Furthermore, the carrier plate is secured relative to the plurality of stator poles on the basis of the above-mentioned stator encoding. The preferred embodiment of such a refinement is explained with reference to the drawing.

BRIEF DESCRIPTION OF THE DRAWINGS

Embodiments of the invention will be described below on the basis of the drawing. The drawing does not necessarily depict the embodiments true-to-scale, but rather, it is presented in schematic and/or slightly distorted form whenever this serves for purposes of illustration. Regarding additions to the teaching that can be derived directly from the drawing, reference is hereby made to the pertinent state of the art. In this context, it should be taken into consideration that many modifications and changes can be made in terms of the form and the details of a given embodiment, without departing from the general idea of the invention. The features of the invention disclosed in the description, in the drawing as well as in the claims, be it individually or in any desired combination, can all be essential for refining the invention. Moreover, all combinations of at least two of the features disclosed in the description, in the drawing and/or in the claims fall within the scope of the invention. The general idea of the invention is not limited to the exact form or details of the preferred embodiment shown and described below, nor is it limited to a subject matter that would be restricted in comparison to the subject matter claimed in the claims. Regarding the dimensional ranges given, values that fall within the cited limits can also be disclosed as limit values and can be employed and claimed as desired. For the sake of simplicity, the same reference numerals will be used below for identical or similar parts or for parts having an identical or a similar function.

Additional advantages, features and details of the invention can be gleaned from the description below of the preferred embodiments as well as on the basis of the drawing. The following is shown:

FIG. 1 a side view of a rotor with a rotor shaft and a rotor core attached onto it, with ball bearings and a fan wheel according to a preferred embodiment of the invention;

FIG. 2 a partially cutaway, front view of the rotor of FIG. 1, depicting the permanent magnets of the rotor core as well as a core lamination in an arrangement relative to a magnetic ring of the fan wheel;

DETAILED DESCRIPTION

Figure 14:
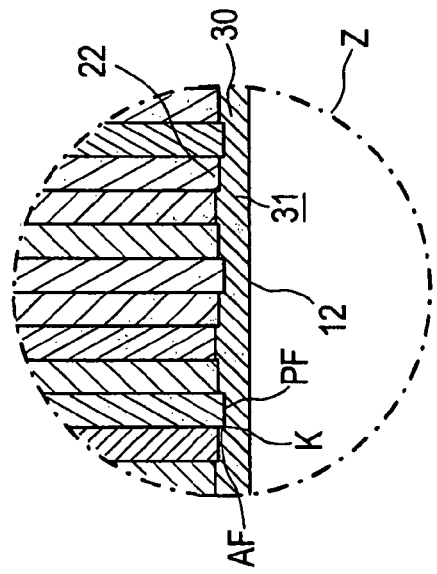
FIG. 14 detail Z of FIG. 13.
Figure 17:
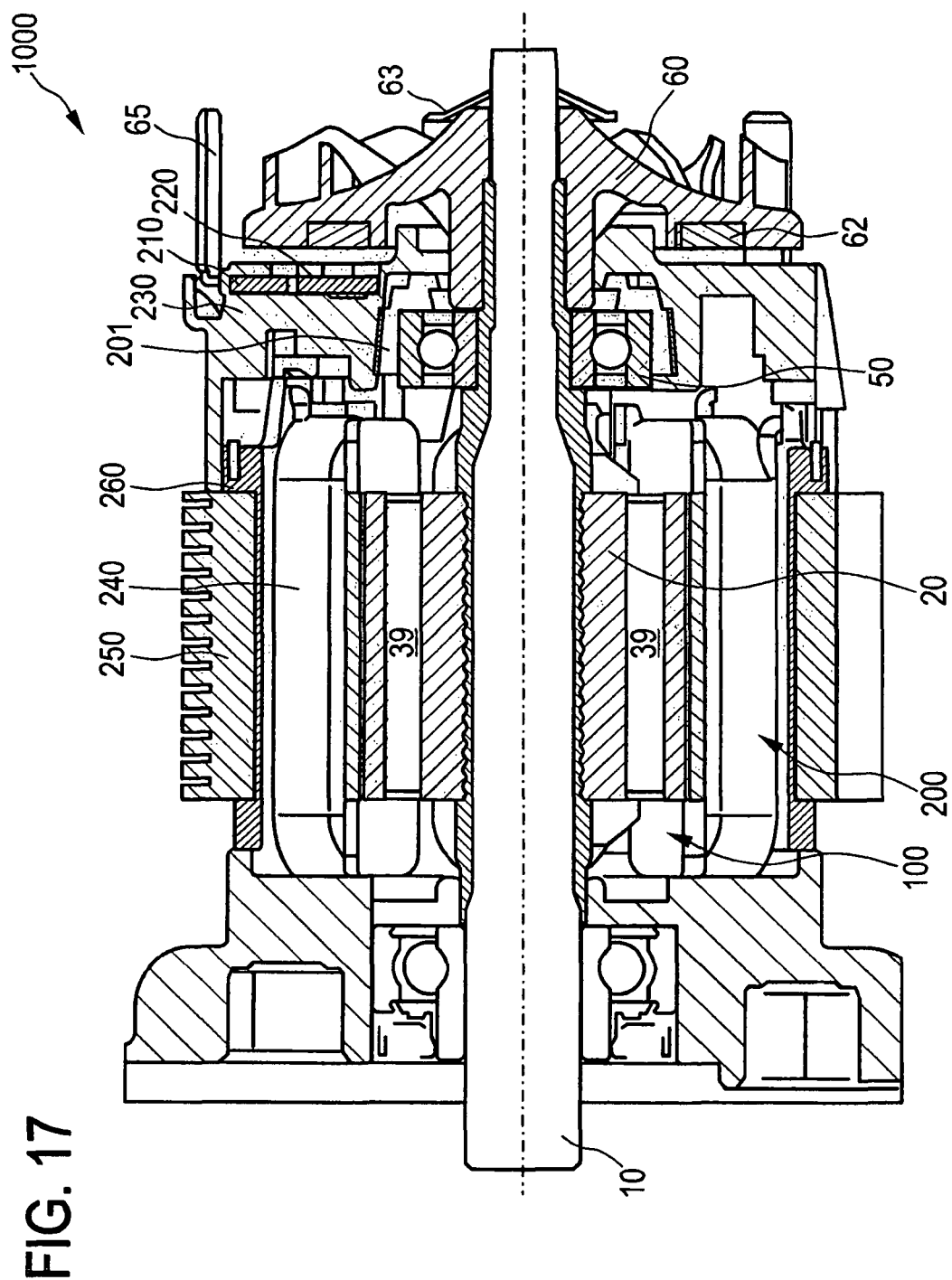
FIG. 17 a sectional view of a completely assembled BLDC electric motor according to an especially preferred embodiment.

FIG. 1 shows a completely assembled rotor 100 for a permanently excited electric motor 1000, shown in greater detail in FIG. 17, which in the present case is configured as a BLDC electric motor with an arrangement consisting of a rotor 100 and a stator 200. For this purpose—as can be seen in FIG. 17—the rotor 100 is arranged so as to be rotatably and magnetically coupled in a recess of the stator 200. FIG. 1 shows the rotor 100 with a rotor shaft 10 and with a rotor core 20 that is attached onto the rotor shaft 10 and that is made up of a plurality of core laminations 40 also shown in FIGS. 2, 5 and 6. In the present case, the core laminations 40 are stacked along an axis A in order to form the rotor core 20. The recesses 80 (as the receiving structure), that are arranged at four peripheral angular positions as shown in FIG. 2, form a chamber (as the receiving element) in the stacked arrangement of the core laminations 40, each chamber receiving a permanent magnet 39 (as the pole-forming element). Each permanent magnet 39 forms a pole of the rotor core 20. The rotor core 20 is affixed to the rotor shaft 10 by means of a transfer-molding process, making use of a transfer-molding compound 30. In this process, the transfer-molding compound 30 surrounds the rotor core 20 along a gap 31 extending along an axial direction as well as radially along an axial cover cap 32.1, 32.2, one of which is also shown in FIG. 14. The gap 31 is formed between an inner circumferential side 22 of the rotor core 20 and an outer circumferential side 12 of the rotor shaft 10. At one end of the rotor shaft 10 that projects out of the rotor core 20, a bearing 50 is provided, here in the form of a ball bearing, for the rotatable mounting of the rotor shaft 10 with the rotor core 20 in the stator 200. The mount is located at a housing section 201 that can be seen in FIG. 17. At the same projecting end, a fan wheel 60 is firmly attached to the rotor shaft 10 and affixed by means of a claw-like disc 63 shown in FIG. 17. The fan wheel 60 as well as the bearing 50 are attached to a bearing and fan mount 33 made of transfer-molding compound 30, and the mount tapers towards one end of the rotor shaft 10. The fan wheel 60 has fan blades 61 on the air-intake side by means of which air is drawn into a fan housing 65 that can be seen in FIG. 17, and this air can be fed in the axial direction to the arrangement consisting of the rotor 100 and the stator 200. As a result, any stagnant hot air that might be outside of the electric motor can be removed. The fan blades 61, which fundamentally have an air-circulating function, can be configured as needed, namely, so as to be curved neutrally, forward or backward. Thus, the electric motor 1000 shown in detail in FIG. 17 and in the remaining drawings is a so-called BLDC electric motor with outside cooling.

On a side of the fan wheel 60 opposite from the fan blades 61, a magnetic ring 62 is incorporated whose four-pole configuration with opposing north (N) and south (S) poles can be seen from a front view in FIG. 2. In the present case, through the application of the transfer-molding compound 30 by means of a transfer-molding process, not only is the rotor core 20 affixed onto the rotor shaft 10, but moreover, the bearing and fan mount 33 is shaped onto the tapering end of the rotor shaft 10. As is explained in detail below, encoding on the bearing and fan mount 33 can be used to install the bearing 50 and, in particular, the fan wheel 60 with the magnetic ring 62 relative to the rotor core 20 so that they are rotationally positioned on the rotor shaft 10 very precisely. Consequently, the four poles of the magnetic ring 62 of the fan wheel 60 are arranged at the same angular positions as the poles of the rotor core 20, without there being a need for a special readjustment or a balancing procedure.

Figure 3:
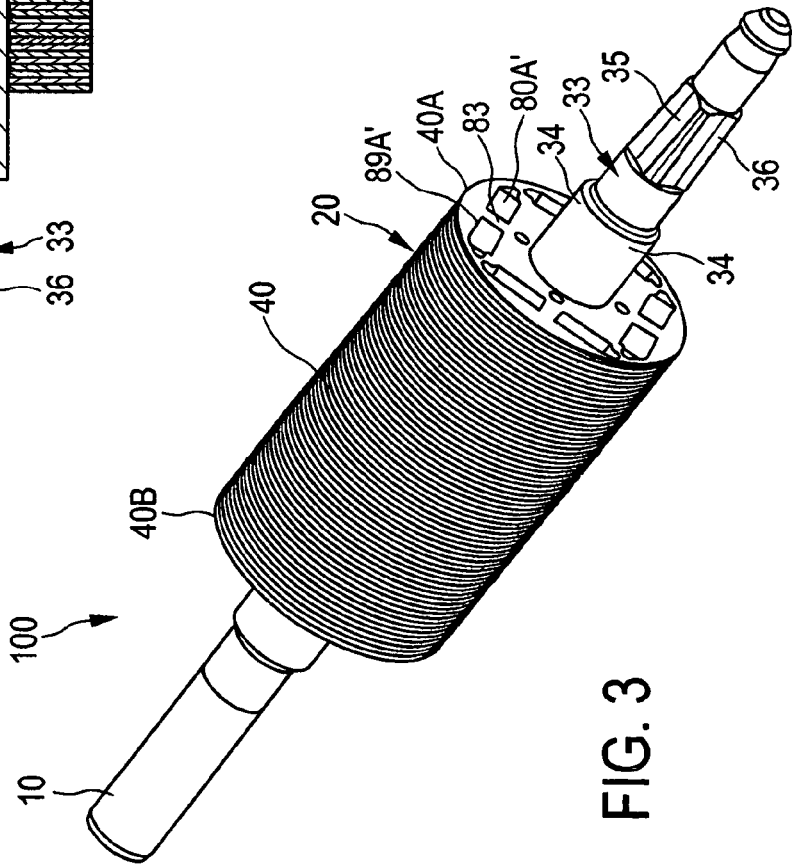
FIG. 3 a perspective view of the partially assembled rotor of FIG. 1 without the fan wheel and the bearings, but depicting a first variant of an encoded bearing mount and fan mount.

For this purpose, FIG. 3 schematically depicts the rotor 100 shown in FIG. 1, but without the bearing 50 and without the fan wheel 60, so that the bearing and fan mount 33 can be seen more clearly. This mount has a bearing seat 34 and a fan seat 35. Whereas the bearing seat 34 is configured with a smooth splined shaft, the fan seat 35 is formed with encoding, in the present case in the form of four webs 36. Due to the encoding, the fan wheel 60 can only be placed onto the rotor shaft 10 in a defined rotational position in which the four poles N, S of the magnetic ring 62 of the fan wheel 60 are arranged at the same angular positions as the poles of the permanent magnets 39 of the rotor core 20. In the present case, the encoding is configured with four webs 36, and each web 36 assumes an angular position that corresponds to the angular position of a permanent magnet 39 of the rotor core 20 as shown in FIG. 2.

Figure 4:
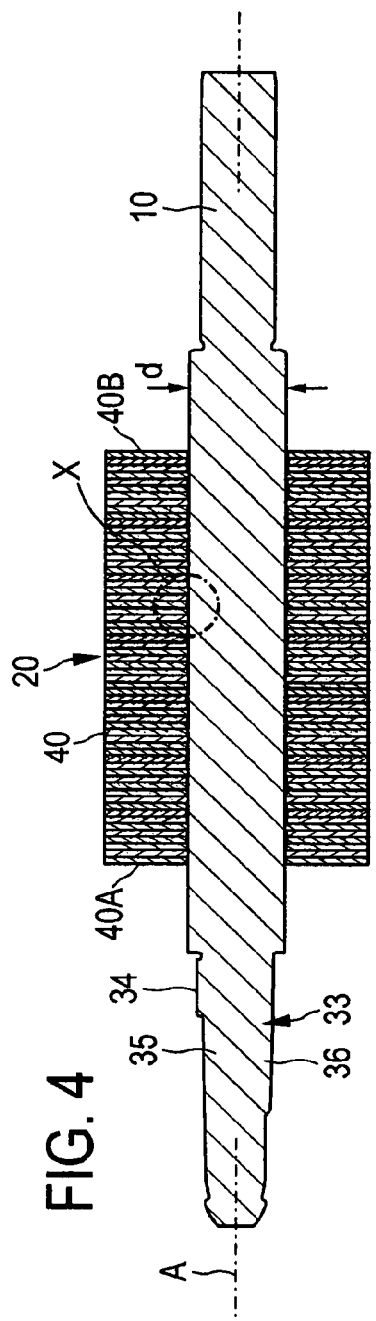
FIG. 4 a sectional view of FIG. 3 along an axis A of the rotor shaft and of the rotor core, with a schematic depiction of the multiple core laminations as well as of a detail X, shown in enlarged form in FIG. 12, in order to illustrate the gap between the inner circumferential side of the rotor core and the outer circumferential side of the rotor shaft.
Figure 5:
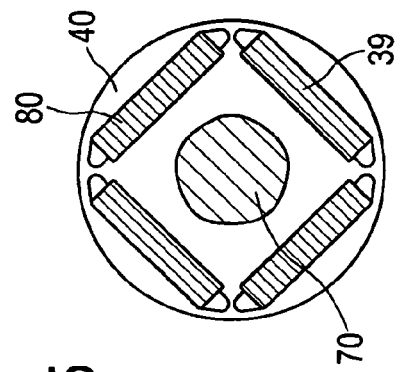
FIG. 5 a schematic depiction of a multiple core lamination from a sectional view of FIG. 4.

FIG. 3 shows the rotor core 20, depicting the individual core laminations 40, which can also be seen in the sectional view of FIG. 4. Between an initial core lamination 40A and a final core lamination 40B—as edge core laminations—multiple core laminations 40 designated in this manner are arranged as shown in FIGS. 2 and 5. The core laminations 40, 40A and 40B are produced by stamping the so-called metal rotor blank. In the stamping tool, individually controlled cutting stamps are used to produce the different core laminations 40, 40A and 40B, which are explained in detail with reference to FIGS. 9A, 9B and 9C.

The depiction in FIG. 5 shows, first of all, the configuration of the multiple core lamination 40 with a central recess 70 through which the rotor shaft 10 passes as well as a plurality of peripheral receiving openings 80 through each of which a permanent magnet 39 passes.

The central recess 70 has a contour 71 of a pentagon that is explained with reference to FIG. 6, that differs from the circular contour 72 and that has undulating roundness deviations RA. The undulating roundness deviations RA are preferably suitable to hold transfer-molding compound while forming the gap 31, and furthermore, to properly secure the rotor core 20 on the rotor shaft 10 against rotating and also to secure it axially. Here, the receiving openings 80 are arranged according to a four-fold rotational symmetry peripherally to the central recess 70, and in this process, they are each oriented along a secant of the otherwise cylindrical core lamination 40. Each of the peripheral receiving openings 80 holds a permanent magnet 39.

Figure 6:
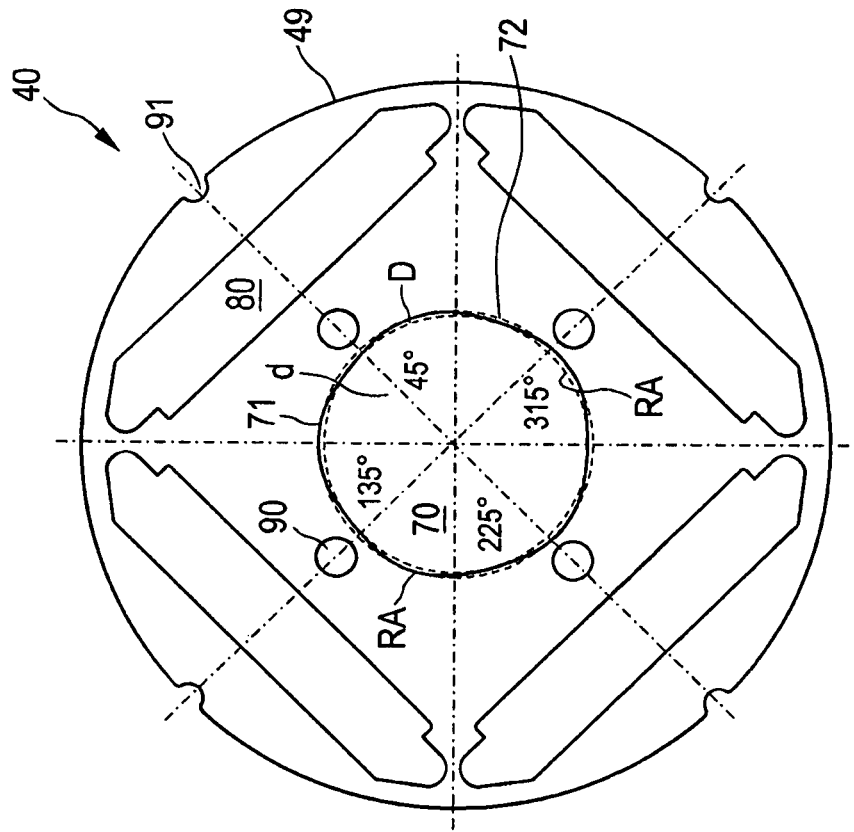
FIG. 6 an enlarged view of the core lamination of FIG. 5 with a central recess through which the rotor shaft is to pass and—in the present case, according to a four-fold rotational symmetry—four peripheral receiving openings, through each of which a permanent magnet is to pass—as well as four lamination points and four encoding markings.

In this vein, as shown in a perspective view of FIG. 6 in enlarged form, the receiving openings 80 are arranged at the angular positions of 45°, 135°, 225° and 315° according to the four-fold rotational symmetry. At the same angular positions, the permanent magnets 39 are held in the chambers formed by the stacked receiving openings in order to form a four-fold rotationally symmetrical four-pole arrangement. This rotational symmetry also corresponds to that of the pole arrangement N-S-N-S on the magnetic ring 62 of the fan wheel 60, as shown in FIG. 2.

The above-mentioned encoding by the four webs 36 on the fan seat 35 of the bearing and fan mount 33 ensures that the fan wheel 60 and thus the magnetic ring 62 and its pole orientation correspond precisely with the pole arrangement of the rotor core 20 formed by the permanent magnets 39. Correspondingly, FIG. 2 shows a pole center of the magnetic ring 62 at each of the angular positions of 45°, 135°, 225° and 315°.

In the production process, the bearing 50 and subsequently the fan wheel 60 can be slid onto the bearing and fan mount 33 that is provided with encoding, said encoding ensuring that—irrespective of the choice of one of the rotational positions defined by the four webs 36—the pole orientation of the magnet ring 62 of the fan wheel 60 corresponds to the pole orientation of the rotor core 20.

During the installation of the electric motor 1000, which is cooled on the outside, the fan wheel 60 on the projecting end of the rotor shaft is pressed onto the encoded fan seat 35 that has been attached to the bearing and fan mount 33, and ultimately, it is axially secured by means of a claw-like disc 63, as shown in FIG. 17. The fan wheel 60 itself is produced with the plastic-bonded four-pole magnet ring 62 by means of a two-component transfer-molding process, and it is magnetized in the transfer mold. In other words, the four poles N-S-N-S of the magnet ring 62 that can be seen in FIG. 2 are magnetized precisely—without angular errors—with respect to the encoding of the fan seat 35. Only after the magnetization has been carried out is the fan ejected from the transfer mold. This ensures that the above-mentioned poles N-S-N-S of the magnet ring 62 of the fan wheel 60 are aligned precisely with respect to the permanent magnet 39 in the rotor core 20 by means of the encoded fan seat 35.

On the basis of the following FIGS. 6 to 15, it is explained that the precise specification of a pole orientation on the rotor core 20 is ensured due to the non-rotatable arrangement of all of the core laminations of the rotor core 20 with respect to each other.

For this purpose, first of all, FIG. 6 shows the core lamination 40 of FIG. 5 in an enlarged view. The core lamination 40 has an essentially smooth cylindrical cross section. The above-mentioned central recess 70 through which the rotor shaft 10 passes, as well as the four peripheral receiving openings 80 through each of which a permanent magnet 39 passes are created in this cylindrical cross section by means of stamping. Moreover, each core lamination 40 has four lamination points 90. In this manner, the core laminations 40 are layered to form a rotor core 20. The receiving openings 80 as well as the lamination points 90 are arranged at an angular position of 45°, 135°, 225° and 315° according to the four-fold rotational symmetry. A rotation of the core lamination 40 by 90° is invariant relative to the rotational position of a receiving opening 80 and of a lamination point 90 as well as of an edge recess 91. In other words, a first core lamination, as shown in FIG. 6, comes to coincide with a second core lamination, as shown in FIG. 6, in terms of the receiving openings 80 as well as in terms of the lamination points 90, whenever a relative angle of rotation is a multiple of 90°. In the present case, this is an indication of the a four-fold rotationally symmetrical arrangement of the permanent magnets 39 in the rotor core 20 or the receiving openings 80 and the lamination points 90.

The same applies as already mentioned for the edge recesses 91 of the core lamination 40. The edge recesses 91 that are created on an outermost edge 49 of the core lamination 40 are arranged so as to be offset by 90° according to the four-fold rotational symmetry. In the case of the edge recesses 91 as well, a core lamination 40 that is rotated by 90° comes to lie so as to coincide with a non-rotated core lamination 40, i.e. it is congruent in terms of the lamination points 90, in terms of the receiving openings 80 and in terms of the edge recesses 91.

Figure 16:
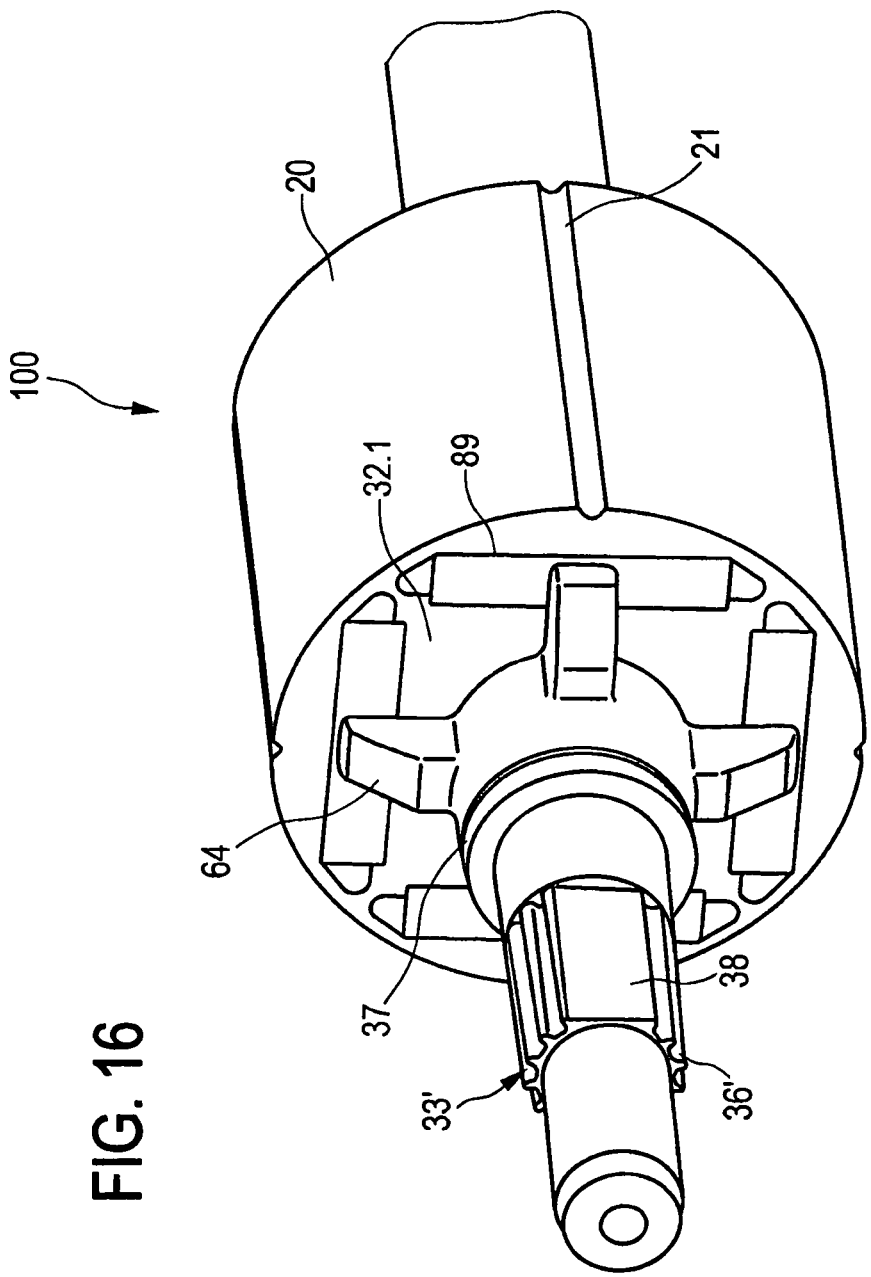
FIG. 16 a perspective view of a completely assembled rotor with a rotor core that is completely encapsulated by the molding process as well as—in the present case, without a fan wheel and a ball bearing—with a second variant of an encoding of the bearing mount and/or fan mount.

With reference to FIG. 16, the edge recesses 91 form an edge groove 21 of the rotor core 20. During the production of the rotor core 20, each of the core laminations 40 with their edge recess 91 is made to engage with a web of a transfer mold (not shown here), so that each of the core laminations 40 is arranged in the rotor core 20 so that it cannot rotate and is encoded, while the four-fold rotational symmetry is retained. In the present case, this is an especially advantageous prerequisite for the efficiency of the additionally described encoding of the bearing and fan mount 33 as well as of the stator. In this manner, poles on the rotor 100, poles of the magnet ring 62 on the fan wheel 60 and the poles on the stator 200 can already be arranged very precisely relative to each other during the production phase.

In the same way that the edge recesses 91 form the above-mentioned groove 21 on the outer circumferential side of the rotor core 20, the receiving openings 80 form an axial chamber extending along the rotor core 20 to hold a permanent magnet 39, also under the 90° rotation of adjacent core laminations 40 with respect to each other that is provided in the present case. In other words, the above-mentioned webs in the transfer mold serve as adjustment means for the core laminations 40 that are rotated with respect to each other, while engaging into the edge recesses 91. Thus, the edge recesses 91 form an encoding marking arrangement according to the four-fold rotational symmetry by means of which a first core lamination and a second core lamination 40 can be arranged non-rotatably relative to each other. The encoding marking arrangement in the form of the edge recesses 91 ultimately guarantees a dimensionally accurate configuration of the chambers to hold a permanent magnet 39 in the receiving openings 80.

As a result, an encoding marking arrangement is formed by means of the edge recesses 91 in such a way that, within the framework of the production accuracy, the core laminations 40 in the rotor core 20 are already arranged so as to be rotated relative to each other. However, the permanent magnets 39 can still be already positioned precisely in a chamber formed by the receiving openings 80, without a need for a readjustment or a balancing of the rotor 100.

Figure 9A:
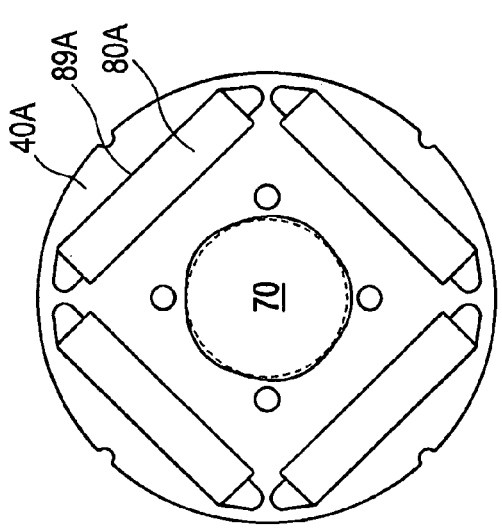
FIG. 9A an initial core lamination for a rotor core shown in FIG. 3 and FIG. 4.
Figure 9C:
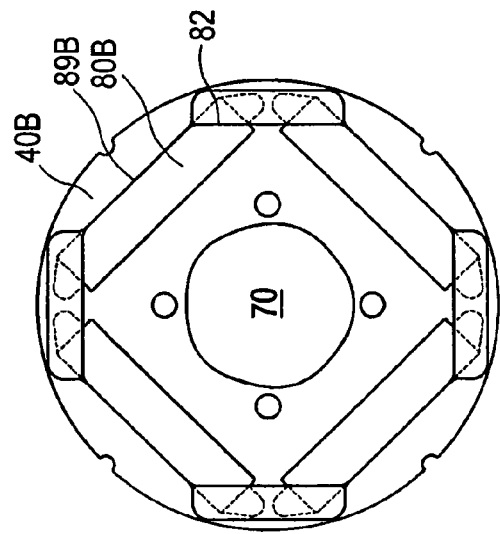
FIG. 9C a final core lamination for a rotor core of FIG. 3 and FIG. 4.
Figure 9B:
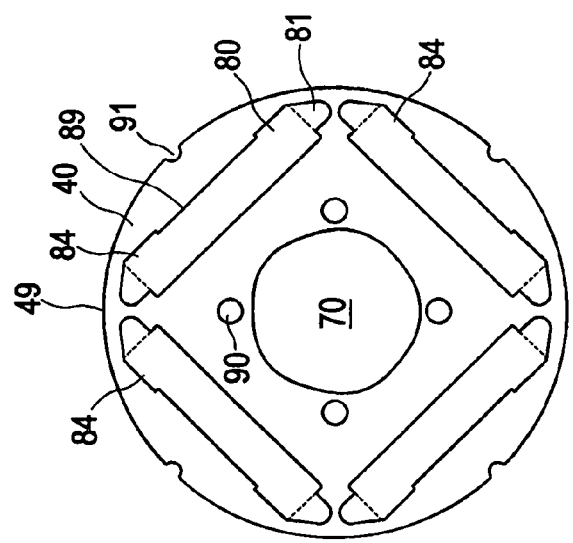
FIG. 9B a multiple core lamination of FIG. 5.

An initial core lamination 40A, which is shown in FIG. 9A, is configured fundamentally similar to the multiple core lamination 40 shown in FIG. 9B for comparison purposes. The receiving opening 80A of the initial core lamination, however, is configured with a strictly rectangular edge 89A, 89B, i.e. without the bulging sections 81 provided in FIG. 9B for the receiving openings 80. Rather, the receiving openings 80A of the initial core lamination—while leaving a filling gap between the edge 89A and the permanent magnet 39—are configured so as to fit precisely onto the dimensions of a permanent magnet 39. Thus, a permanent magnet 39 is surrounded with a precise fit by the receiving opening 80A of the initial core lamination 40A. The filling gap that remains between the edge 89A of the receiving opening 80A and the permanent magnet 39 is filled with transfer-molding compound 30, so that the permanent magnet 39 is held even better in the receiving opening 80A. Due to a somewhat larger circumference of an edge 89A of the receiving opening 80A (in comparison to the edge 89 of the receiving opening 80), the axial sealing of the permanent magnet 39 in the transfer mold is made considerably easier, and moreover, less surface pressure is achieved, which makes the entire transfer-molding process more reliable.

The receiving opening 80A is shown in a variant 80A' in FIG. 3, where it has a center web 83. The web 83 serves to axially position and support a permanent magnet 39. The center web 83 also serves to support a transfer-molding compound head 37 at its tabs 64, as can be seen in FIG. 16. Thus, the webs 83 support the tabs 64 of the transfer-molding compound head 37 at an axial covering cap 32.1. Such a web can also be provided at a final core lamination 80B and it fundamentally does not hinder the magnetic field conditions.

In FIG. 9B, it can be seen that the permanent magnet 39 is additionally secured laterally in the chamber of the multiple core laminations 40 formed by the receiving openings 80. This is achieved by the transfer-molding compound 30 that is present in the bulging sections 81 at the edge 89 of the receiving openings 80 of the multiple core laminations 40. The cutaway sections 84 formed at the edge 89 during the stamping procedure are also filled with transfer-molding compound, and they affix a permanent magnet 39 additionally at its corners. For the rest, the receiving openings 80 are formed with their essentially rectangular shape of an edge 89 so as to fit precisely and to lie closely on the permanent magnet 39, so that said permanent magnet 39 is already positioned precisely when it is inserted into the chamber.

The configuration of the multiple core lamination 40 in combination with the initial core lamination 40A achieves not only an especially dimensionally accurate configuration of a chamber to hold a permanent magnet 39, but also that a permanent magnet 39 is properly secured laterally through the adequate distribution of the transfer-molding compound 30, for example, in bulging sections 81 and cutaway sections 84 on different sides of the permanent magnet 39.

In FIG. 9C, the permanent magnet 39 is secured axially in a very stable manner by means of a special configuration of a final core lamination 40B. The final core lamination 40B, which is for the rest configured in the same manner as the multiple core lamination 40, in turn, has a modified opening 80B that is likewise associated with a permanent magnet 39, but through which the permanent magnet 39 does not pass. For this purpose, the edge 89B of the opening 80B is provided with a lateral bevel 82 that serves as a final stop for a premounted permanent magnet 39. Due to the even larger circumference of the edge 89B of the receiving opening 80B (in comparison to the edge 89A of the receiving opening 80A), not only is an axial sealing of the permanent magnet 39 in the transfer mold made considerably easier, but rather, less surface pressure is achieved, which makes the entire transfer-molding process more reliable. During the stamping lamination, a final core lamination 40B is stacked to form the multiple core laminations 40 of the rotor core 20. For this purpose, the final core lamination 40B is laid into the transfer mold, along with the permanent magnets 39 after they have been inserted into their chambers, and then transfer-molded on all sides with the transfer-molding compound 30 together with the rotor shaft 10 and the rotor core 20.

Such a joining process can fundamentally be used with any kind of rotor core according to the low-voltage guidelines. All in all, these measures result not only in a rotor core 20 that is configured so as to be dimensionally accurate with precisely arranged permanent magnets 39, but they also result in a rotor core 20 that is relatively stable in and of itself, with securely arranged permanent magnets 39 that are secured axially as well as radially. For purposes of better handling during the transfer molding of the rotor core 20 and of the rotor shaft 10, the permanent magnets 39 are at first not magnetized in the present case. As rod magnets, they can thus be more easily inserted into the rotor core 20, i.e. into the chambers formed by the receiving openings 80. Moreover, at first, there is no need to pay attention to the polarity of the permanent magnets 39. By the same token, there is no need for concern that adhesions will occur on the permanent magnet 39 during the transfer-molding process. Thus, especially the entrainment of dirt into a transfer mold is virtually ruled out. The rotor 100, which has been encapsulated by the molding process, as is shown in FIG. 16, is then subsequently magnetized through polarization of the permanent magnets 39.

A crucial aspect for an especially good attachment of the rotor core 20 onto the rotor shaft 10 is the formation of the central recess 70 in the core lamination 40 according to the concept of the invention.

Making reference to FIG. 6 once again, the rotor core of the present embodiment is especially securely and reliably affixed to the rotor shaft 10, thanks to the pentagonal contour 72, which differs from the circular contour 72. For this purpose, the pentagon is formed as a special geometric contour 71 of the central recess 70 in the core lamination 40. In the present case, the contour 71 of the central recess 70 is in the shape of a pentagonal convex arc-polygon, which is also called a pentagon. The contour 71 can also be referred to as a pentagonal orbiform curve. Orbiform curves are contours having a constant width, that is to say, every possible cross sectional diameter of the orbiform curve has the same value. Moreover, an orbiform curve has an odd-numbered polygonicity—in the present case, five corners—and sides of equal length. Consequently, the contour 71 of the central recess 70, referred to as a pentagon, has a pentagonicity that differs from the multiple rotational symmetry of the angular arrangement of the poles. As a result, a first core lamination 40, relative to a second core lamination 40, does not come to lie congruently on each other in the area of the central recess 70 at a relative angle of rotation of 90° that is provided here. Rather, as shown in enlarged form in FIG. 11 as detail Y of FIG. 10, the edges K of the pentagon of the first core lamination and of the second core lamination are at a distance from each other in the radial direction. In the present embodiment, while the four-fold rotational symmetry is retained—except for the central recess 70—all of the other recesses of a core lamination 40 come to lie on each other with a 90° rotation. In the area of the central recess 70, this leads to the formation of an uneven surface OF in the direction of the axis A of the rotor core 20. Concretely speaking, during the production step of the stamping lamination using the above-mentioned lamination points 90, the individual core laminations 40 are stacked to form the rotor core 20, namely, in such a way that adjacent core laminations 40 are rotated relative to each other by an angle of 360°/n—in the present case with four poles by 90°, as a function of the multiplicity n of the rotational symmetry of the pole arrangement. As a result, in the present case, the geometric position of the contour 71 of the pentagon is rotated by 18° from one core lamination to the next—namely, by the difference between 90° and the orbiform curve angle, in the case of five corners, it is 72° here. This leads to the formation of the above-mentioned uneven surface OF. Hence, the uneven areas in the form of the edges K of the contours 71 run crosswise to the axis A of the rotor core 20.

Figure 12:
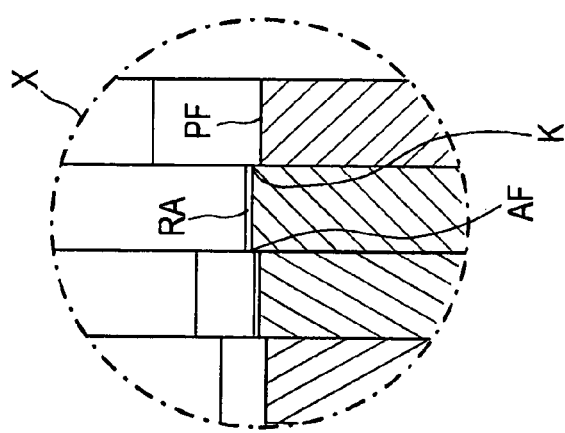
FIG. 12 detail X of FIG. 4.
Figure 11:
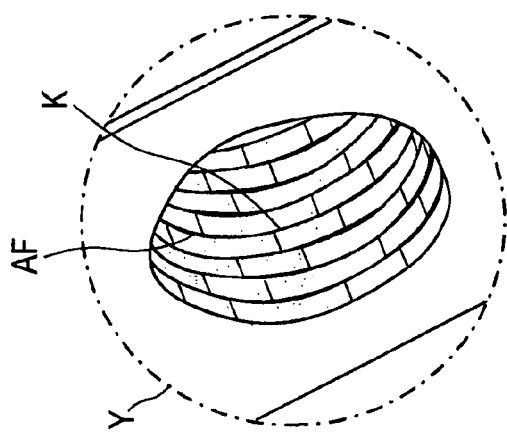
FIG. 11 detail Y of FIG. 10.
Figure 10:
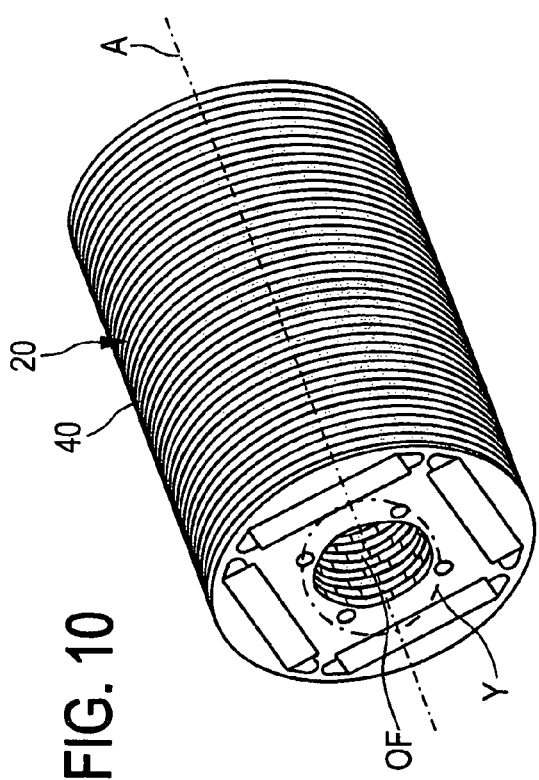
FIG. 10 a perspective view of only the rotor core of FIG. 3 and FIG. 4, without the rotor shaft, in order to illustrate the uneven surface on an inner circumferential side of the rotor core as well as the designation of detail Y shown in enlarged form in FIG. 11.

In the perspective views shown in FIG. 10 of the isolated rotor core 20 with the individual core laminations 40 and the enlarged detail Y shown in FIG. 11 and the enlarged detail X shown in FIG. 12, it can be seen in greater detail that the uneven surface OF is formed with the edges K as well as with the adjacent areas AF of the central recess 70 and with the pressure area PF formed by the inner ring areas. Enlarged gaps or pressure areas PF result especially in the area of the roundness deviations RA that can be seen in FIG. 6, that is to say, where the contour 71 of the pentagon differs from the circular contour 72. The uneven surface OF on the inner circumferential side of the rotor core 20 can be recognized by the edges K that are at a distance from each other and that are visible in the thickened area of FIG. 11.

Concretely speaking, when the rotor core 20 is attached with a precise fit onto the rotor shaft 10, the pressure areas PF of the uneven surface OF that protrude on the recognizable edges K and that are visible in FIG. 12 can move into the adjacent undulating roundness deviations RA. Among other things, the core laminations 40 become wedged on the rotor shaft 10. Due to the uneven surface OF on the inner circumferential side 22 of the rotor core 20, an especially good interference fit of the rotor core 20 on the rotor shaft 10 is established, without the need for the surface of the rotor shaft 10 to be specially processed. Moreover, the above-mentioned enlarged gaps can be readily filled with transfer-molding compound 30. The rotor shaft can be supplied in a more or less roughly manufactured form.

In order to create an advantageous interference fit, the mean diameter D of the contour 71 of the pentagon shown in FIG. 6 has to be selected so as to be only slightly larger than the outer diameter d of the rotor shaft 10 shown in FIG. 4. In other words, an outer diameter d falls between an inner diameter Di of the pentagon and an outer diameter Da thereof; that is to say, there are only five pressure areas in the case of the above-mentioned an interference fit of the core lamination 40 and the rotor shaft 10. This advantageously reduces the necessary pressure forces, and nevertheless, a secure interference fit is achieved.

Figure 7:
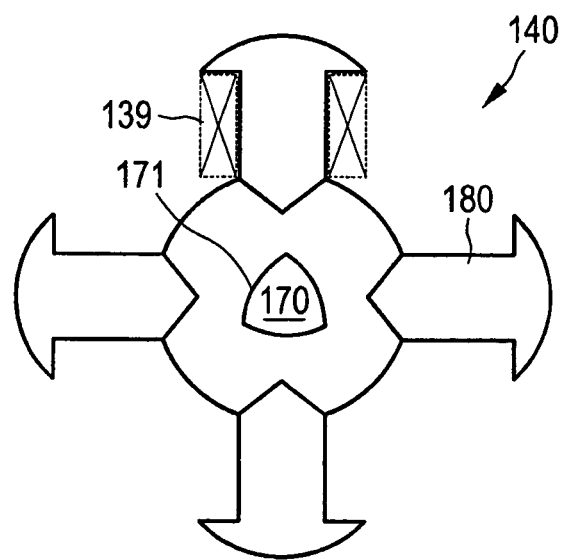
FIG. 7 an enlarged view of another core lamination for an alternative embodiment according to the invention, in which a receiving structure is provided in the form of a plurality of armature teeth, each for receiving a coil winding—this is according to a multiple rotational symmetry in combination with a central recess having a contour according to a three-fold rotational symmetry.
Figure 8:
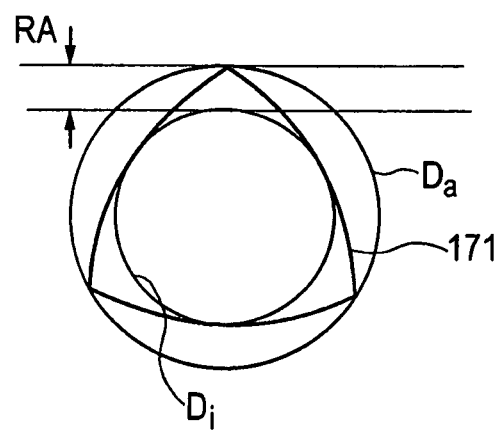
FIG. 8 the contour of the central recess of the core lamination of FIG. 7 in a schematic diagram with an inscribed circle and a circumscribed circle to illustrate, by way of an example, a roundness deviation for a contour of the central recess.

In the example, the additional configuration of a central recess 170 can be seen in the embodiment of FIG. 7 and FIG. 8. FIG. 7 shows an alternative configuration of a multiple core lamination 140 that has a plurality of receiving structures arranged at peripheral angular positions in the form of an armature tooth 180. The angular positions correspond to 90°, 180°, 270° and 360° according to a four-fold rotational symmetry, so that, when adjacent core laminations 140 are continuously rotated by 90°, the armature teeth 180 come to lie congruently on each other. In this manner, a receiving element is created in the form of an armature on the rotor core. The armature then serves to receive a coil winding 139 that is symbolically drawn in FIG. 7 and that forms a pole as a pole-forming element on the rotor core. The poles of the rotor core, which is configured with a core lamination 140 of FIG. 7, are positioned at angles of 90°, 180°, 270° and 360° according to the four-fold rotational symmetry. The core lamination 140 also has a central recess 170 with a contour 171 that, when adjacent core laminations 140 are rotated, are not arranged congruently with respect to each other. In the embodiment of a core lamination shown in FIG. 7, the contour 171 has the shape of a convex arc-triangular orbiform curve, namely, of a so-called Reuleaux triangle.

The Reuleaux triangle of the contour 171 is depicted in FIG. 8 in enlarged form with an inscribed circle as well as with a circumscribed circle. In the present case, the inscribed circle yields an inner diameter $D_i$ of the Reuleaux triangle. In the present case, the circumscribed circle yields an outer diameter $D_a$ of the Reuleaux triangle. The contour 171 of the central recess 170 runs with a roundness deviation RA between the inscribed circle having an inner diameter $D_i$ and the circumscribed circle having an outer diameter $D_a$, that is to say, it has an amplitude amounting to $D_a$-$D_i$. This applies analogously to the pentagon shown in FIG. 6 with the roundness deviation RA designated there relative to the mean diameter D. This mean diameter D is obtained as the mean value resulting from an inner diameter $D_i$ of an inscribed circle and an outer diameter $D_a$ of a circumscribed circle (not shown in FIG. 6).

In the present case, this results in a roundness deviation RA for the embodiment of FIG. 6 and the embodiment of FIG. 8, whose amplitude amounts to between 0.5% and 2% of a mean diameter D stemming from the inner diameter $D_i$ and the outer diameter $D_a$. It has been found that an amplitude thus selected for the roundness deviation RA is especially well-suited to form the pressure areas PF shown in FIG. 12 on the one hand, and enlarged gaps on the other hand, by means of the roundness deviations RA. Accordingly, the edges K and the contact areas AF protrude in order to form the uneven surface OF. Thanks to the transfer-molding interference fit, the rotor core 20 can be attached onto a rotor shaft 10 so as to be especially tightly and precisely positioned, even a rotor shaft 10 that is roughly processed or unprocessed or, if applicable, a smooth one.

Figure 13:
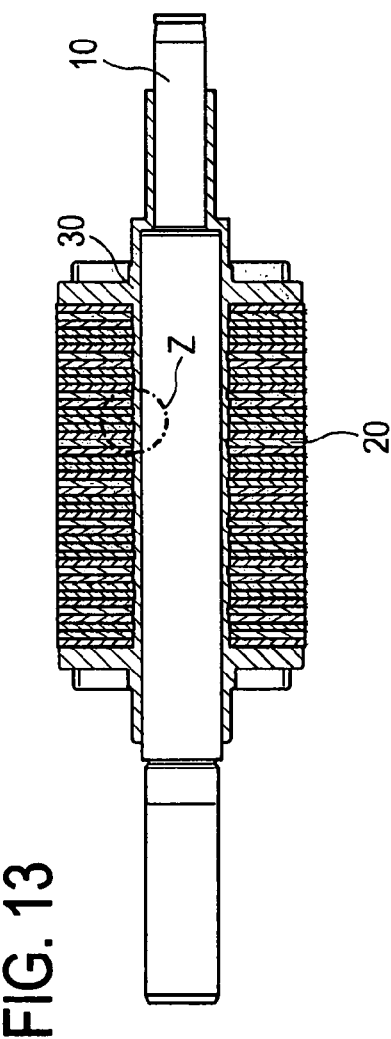
FIG. 13 a sectional view of the rotor provided with the transfer-molding compound of FIG. 3, indicating detail Z.
Figure 15:
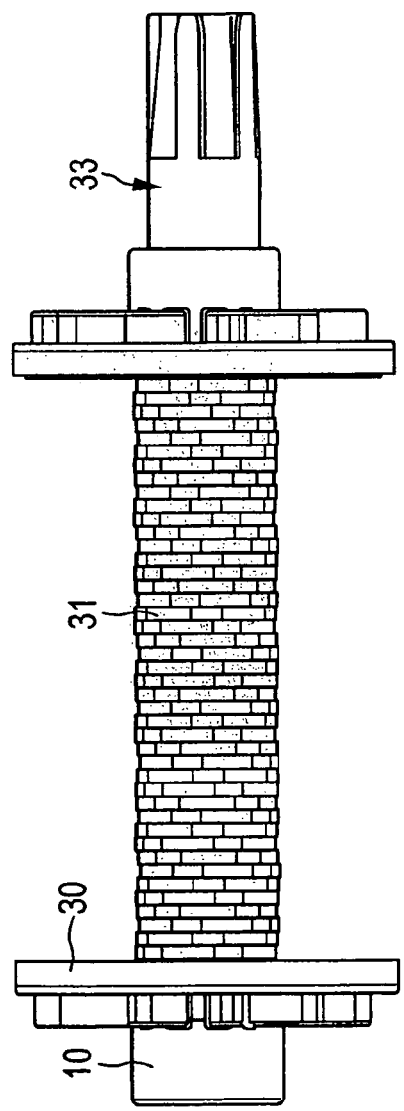
FIG. 15 a side view of the rotor shaft of FIG. 13, without the rotor core, but with the transfer-molding compound, as it is accumulating and solidifying in the complex gap between the inner circumferential side of the rotor core and the outer circumferential side of the rotor during a transfer-molding process.

In an embodiment that can be seen in FIGS. 13 to 15, in the present case, the outer diameter d of the rotor shaft 10 is selected so as to be smaller than the mean diameter D of the pentagon of the contour 71 of the central recess 70 of FIG. 6. As shown in detail in FIG. 15, this results in a distribution of the transfer-molding compound 30 that—as can be seen in detail Z of FIG. 14—fills transfer-molding compound 30 into a gap 31 situated between the inner circumferential side 22 of the rotor core 20 and the outer circumferential side 12 of the rotor shaft 10. As a result, the rotor core 20 is completely isolated from the rotor shaft 10. In this context, FIG. 15 shows in detail the distribution of the transfer-molding compound 30 on the rotor shaft 10 that is achieved within the scope of the transfer molding process, without the rotor core 20. Due to the edges K, which are rotated opposite from each other and are thus at a distance from each other, areas AF of the uneven surface OF, which are adjacent to the contour 71 of the central recess, are exposed. Consequently, within the scope of the above-mentioned transfer-molding interference fit, the rotor core 20 can be affixed onto the rotor shaft 10 in an especially reliable, non-rotating manner, axially as well as circumferentially.

The above-mentioned permanent magnets 39—supported by the formation of the core laminations 40, 40A, 40B—are also surrounded by the transfer-molding compound 30 on all sides.

The transfer-molding compound head 37 situated on the front face and shown in FIG. 16 serves to surround the permanent magnets 39 on all sides, so that the permanent magnets 39 are positioned precisely and affixed without any play. The length of the permanent magnets 39, as can be seen in FIG. 4, is shorter than the length of the rotor core 20 by at least two core lengths (of the initial core lamination 40A and of the final core lamination 40B). FIG. 16 shows the above-mentioned rotor 100 that has been completely encapsulated by the molding process, except for the fan wheel 60 and the bearing 50. An encoded placement of the core laminations 40 with their edge recesses results in the formation of the edge groove 21.

The encoded placement of the core laminations 40 also assists the encoded attachment of a bearing and fan mount 33', which is shown here in yet another modified form. This bearing and fan mount 33' has a plurality of webs 36' as well as at least one flat surface 38 that is oriented parallel to the longer section of the edge 89 of a receiving opening 80 for a permanent magnet 39. As a result, in an alternative to FIG. 3, the encoding is created on a bearing and fan mount 33' in contrast to the bearing and fan mount 33 of FIG. 3. Here, too, a fan wheel 60 is transfer-molded onto the protruding rotor shaft end with its encoded fan seat 35', which has been installed on the bearing and fan mount 33', and finally axially secured with a claw-like disc 63 as shown in FIG. 17. In other words, the four poles N-S-N-S of the magnet ring 62 that can be seen in FIG. 2 can be arranged precisely—without angular errors—relative to the flat surface 38 of the fan seat 35'.

FIG. 17 shows the above-mentioned completely assembled electric motor 1000 with the rotor 100 and the stator 200. On the stator 200 of the electric motor 1000, three Hall sensors 220 are arranged on a printed circuit board 210 at an angle of 60°, and these Hall sensors 220 can detect the position of the rotor 100; this allows an electronic regulation of the electric motor 1000. The printed circuit board 210, in turn, is fastened to a carrier plate 230 of the stator based on the encoding, in the present case, by means of hot caulking. The three Hall sensors 220 are each located between the stator coils 240, that is to say, the carrier plate 230 is joined to the stator housing 250, likewise by means of the encoding. In the present case, this is done by means of a positive fit at the winding support 260 of the stator 200.

The components, namely, the core lamination 40, the bearing and fan mount 33 as well as the carrier plate 230 and the printed circuit board 210 have encoding that is harmonized with each other. Thanks to a simple assembly of the individual components that makes use of the encoding, there is no need for laborious adjustment work in order to detect the position of the rotor 100 and to regulate the electric motor 1000.

What is claimed is:

1. A rotor for an electric motor, the rotor comprising:
 a rotor shaft;
 a rotor core attached on the rotor shaft and having a plurality of core laminations arranged along an axis of the rotor core, and having a plurality of poles of at least one pole pair, each core lamination having a central recess, the rotor shaft passing through the central recess, the central recess having a contour as well as adjacent areas, and each core lamination having a plurality of receiving structures arranged at peripheral angular positions in order to each form a receiving element for a pole-forming element of the rotor core,
 the rotor core having a surface facing the rotor shaft, the surface being formed together with the adjacent areas of the central recess of the plurality of core laminations, and having uneven areas crosswise to the axis of the rotor core formed by the contours of the respective central recesses of respective core laminations of the plurality of core laminations, the contours of the respective central recesses of respective at least a first core lamination and a second core lamination of the plurality of core laminations being arranged so as not to be congruent with each other;
 the contours of the respective central recesses of the core laminations having an odd-numbered rotational symmetry and the plurality of receiving structures having an even-numbered rotational symmetry.

2. The rotor as recited in claim 1 wherein one pole of at least one pole pair is created by the pole-forming element, the pole-forming element being a permanent magnet, the permanent magnet being arranged in the plurality of receiving structure configured as a receiving opening, the receiving opening forming a chamber for the permanent magnet in the rotor core, or a pole of at least one pole pair is created by the pole-forming element, the pole forming element being a coil winding, the coil winding being arranged on the plurality of receiving structures configured as an armature tooth, via which a receiving element in the form of an armature for the coil winding is formed on the rotor core.

3. The rotor as recited in claim 1 wherein the central recess of a core lamination has the contour in the form of a polygon or a convex arc-polygonal orbiform curve.

4. The rotor as recited in claim 3 wherein the contour has the orbiform curve and the orbiform curve is configured in the form of a Reuleaux triangle or a pentagon or a seven-cornered convex arc-polygon.

5. The rotor as recited in claim 1 in that the contour of the central recess runs with a roundness deviation between an inscribed circle having an inner diameter and a circumscribed circle having an outer diameter, a roundness deviation being greater than 0.1% and smaller than 5% of a mean value resulting from the inner diameter and the outer diameter.

6. The rotor as recited in claim 1 wherein the first and second core laminations of the plurality of core laminations are rotated relative to each other while each forming the receiving element for the pole-forming element on the rotor core, the contours of the central recesses being rotated so as not to be arranged congruently to each other.

7. The rotor as recited in claim 1 wherein a core lamination has a plurality of encoding markings on the basis of which the first core lamination can be affixed so as to be rotated relative to the second core lamination in such a way that the receiving structures align.

8. The rotor as recited in claim 1 wherein a multiple core lamination of a plurality of core laminations has a plurality of essentially rectangular receiving openings through which a permanent magnet defining the pole-forming element passes, the receiving openings arranged at peripheral angular positions, the receiving opening having an edge forming a lateral bulging section or a lateral cutaway section to receive transfer-molding compound.

9. The rotor as recited in claim 1 wherein the rotor core has at least one edge core lamination having an edge core lamination central recess through which the rotor shaft passes, as well as a plurality of essentially rectangular receiving openings arranged at peripheral angular positions and each associated with a permanent magnet defining the pole-forming element, each having an edge having a lateral bevel or a web dividing the receiving opening.

10. The rotor as recited in claim 1 wherein the rotor core is surrounded by transfer-molding compound axially and radially.

11. The rotor as recited in claim 1 wherein the rotor shaft has a bearing mount or fan mount with a splined shaft or a bearing or a fan wheel arranged on at least one encoding in a predetermined manner so as to be non-rotatable relative to the plurality of receiving structures arranged at peripheral angular positions in order to each form a receiving element for a pole-forming element.

12. The rotor as recited in claim 11 wherein the encoding of the bearing mount or fan mount comprises a number of webs equal to the number of poles or the webs are arranged at angular positions that correspond to the angular positions of the receiving structures.

13. The rotor as recited in claim 11 wherein the encoding of the bearing mount or fan mount comprises a flat surface parallel to a cross sectional side of the receiving structure or that is arranged at an angular position that corresponds to at least one angular position of the receiving structures.

14. The rotor as recited in claim 1 further comprising a fan wheel installed on the rotor shaft and having a magnetic ring with further poles or fan blades arranged at angular positions that correspond to the angular positions of the receiving structures.

15. A production method for a rotor for an electric motor with a magnetically coupled arrangement including the rotor and a stator, the stator having a plurality of stator poles associated with at least one pole pair of the rotor, the method comprising the following steps:

providing the rotor shaft;

attaching a rotor core onto the rotor shaft, the rotor core having a plurality of core laminations arranged along an axis of the rotor core and having a plurality of permanent magnets arranged at peripheral angular positions in order to form poles of at least one pole pair, wherein each core lamination has:

a central recess, the rotor shaft passing through the central recess, the central recess having a contour as well as adjacent areas, and a plurality of receiving openings arranged at peripheral angular positions in order to each form a chamber for at least one of the plurality of permanent magnets in the rotor core, the attachment being carried out by:

arranging a first core lamination so as to be rotated relative to a second core lamination while forming the chamber in the rotor core through which the at least one permanent magnet passes, and while forming a surface of the rotor core facing the rotor shaft together with the adjacent areas of the respective central recesses of respective core laminations of the plurality of core laminations, and with uneven areas crosswise to the axis of the rotor core being formed by the contours of the central recesses of the plurality of core laminations, in that the contours of the respective central recesses of respective at least the first core lamination and the second core lamination of the plurality of core laminations are arranged so as not to be congruent with each other; and transfer molding of a transfer-molding compound axially or radially with respect to the laminated core; the contours of the respective central recesses of the core laminations having an odd-numbered rotational symmetry and the plurality of receiving structures having an even-numbered rotational symmetry.

16. The production process as recited in claim 15 wherein each core lamination has a plurality of encoding markings and the rotor core is inserted into a transfer mold in a manner that is encoded on the basis of the plurality of encoding markings, the first core lamination being arranged so as to be rotated relative to the second core lamination, while forming the chamber in the rotor core through which the permanent magnet passes.

17. The production process as recited in claim 15 wherein the plurality of receiving openings are arranged at first peripheral angular positions according to an even-numbered rotational symmetry, and the central recess through which the rotor shaft passes has a contour that has an odd-numbered rotational symmetry, and the first and second core laminations are rotated relative to each other according to the even-numbered rotational symmetry.

18. The production process as recited in claim 15 wherein the rotor core is attached onto the rotor shaft by means of the transfer molding or an interference fit, wherein the value of an outer diameter of the rotor shaft falls between an inner diameter of an inner cylinder defined by an inscribed circle and an outer diameter of an outer cylinder defined by a circumscribed circle, the inner and outer cylinders being associated with the surface of the rotor core facing the rotor shaft, and a gap formed between the rotor shaft and the contour of the recess can be thus filled with the transfer-molding compound, or a pressing surface of the recess adjacent to the contour is pressed against the rotor shaft.

* * * * *